(12) United States Patent
Bury

(10) Patent No.: US 7,770,711 B1
(45) Date of Patent: Aug. 10, 2010

(54) REBAR GUIDE ATTACHMENT FOR A CONVEYOR

(76) Inventor: Thomas A. Bury, 4390 Nason Pkwy. NE., St. Michael, MN (US) 55376

( * ) Notice: Subject to any disclaimer, the term of this patent is extended or adjusted under 35 U.S.C. 154(b) by 0 days.

(21) Appl. No.: 12/052,896

(22) Filed: Mar. 21, 2008

(51) Int. Cl.
*B65G 25/00* (2006.01)
*B65G 47/26* (2006.01)
*B65G 47/34* (2006.01)
*B65G 47/82* (2006.01)

(52) U.S. Cl. .................. 198/370.04; 198/409; 198/456; 198/598

(58) Field of Classification Search ................. 198/416, 198/409, 456, 598
See application file for complete search history.

(56) References Cited

U.S. PATENT DOCUMENTS

| 4,448,298 | A | * | 5/1984 | Matsuo | 198/451 |
| 4,832,177 | A | * | 5/1989 | Bollig et al. | 198/451 |
| 4,905,816 | A | * | 3/1990 | Matsuo et al. | 198/448 |

\* cited by examiner

*Primary Examiner*—Gene Crawford
*Assistant Examiner*—Yolanda Cumbess
(74) *Attorney, Agent, or Firm*—David A. Lingbeck

(57) ABSTRACT

A rebar guide attachment for a conveyor for preventing the rebar from coming out of the conveyor while be cut and for aligning the rebar for dispensing into a rack. The rebar guide attachment for a conveyor includes a rebar guard and alignment assembly being attached to a dispensing rack for preventing rebar from spilling out of a conveyor upon being cut and for aligning the rebar prior to being dispensed onto a receiving rack.

11 Claims, 3 Drawing Sheets

REBAR GUIDE ATTACHMENT FOR A CONVEYOR

BACKGROUND OF THE INVENTION

1. Field of the Invention

The present invention relates to rebar guides and more particularly pertains to a new rebar guide attachment for a conveyor for preventing the rebar from coming out of the conveyor while be cut and for aligning the rebar for dispensing into a rack.

2. Description of the Prior Art

The use of guide attachments on conveyors is known in the prior art. More specifically, guide attachments heretofore devised and utilized are known to consist basically of familiar, expected and obvious structural configurations, notwithstanding the myriad of designs encompassed by the crowded prior art which have been developed for the fulfillment of countless objectives and requirements. The prior art includes U.S. Pat. No. 4,832,177 which comprises a hinged channel for receiving steel bars. The steel bars are amassed in the channel and then fed onto a bed by opening the channel. Another prior art includes U.S. Pat. No. 4,051,956 which comprises an L-shaped arm being pivotally connected to a top rail. The L-shaped arm is lifted to a horizontal position to allow the tubes to roll thereupon and the L-shaped arm is lowered to allow the tubes to be dispensed therefrom. Also another prior art includes U.S. Pat. No. 7,156,605 which comprises a retention assembly for retaining a stack and the retention assembly includes a moveable retention bar upon which the stack is retained. In addition, another prior art includes U.S. Pat. No. 4,389,148 which comprises a trough having moveable stops positioned thereon to control the movement of the work pieces. Yet another prior art includes European Pat. No. EP0326001 which comprises an entry conveyor and exit conveyor with hold-down assembly for guiding the work pieces.

While these devices fulfill their respective, particular objectives and requirements, the aforementioned patents do not disclose a new rebar guide attachment for a conveyor.

SUMMARY OF THE INVENTION

The general purpose of the present invention, which will be described subsequently in greater detail, is to provide a new rebar guide attachment for a conveyor which has many of the advantages of the rebar guides mentioned heretofore and many novel features that result in a new rebar guide attachment for a conveyor which is not anticipated, rendered obvious, suggested, or even implied by any of the prior art rebar guides, either alone or in any combination thereof. The present invention includes a rebar guard and alignment assembly being attached to a dispensing rack for preventing rebar from spilling out of a conveyor upon being cut and for aligning the rebar prior to being dispensed onto a receiving rack.

None of the prior art includes the combination of the elements of the present invention.

There has thus been outlined, rather broadly, the more important features of the rebar guide attachment for a conveyor in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new rebar guide attachment for a conveyor which has many of the advantages of the rebar guides mentioned heretofore and many novel features that result in a new rebar guide attachment for a conveyor which is not anticipated, rendered obvious, suggested, or even implied by any of the prior art rebar guides, either alone or in any combination thereof.

Still another object of the present invention is to provide a new rebar guide attachment for a conveyor for preventing the rebar from coming out of the conveyor while be cut and for aligning the rebar for dispensing into racks.

Still yet another object of the present invention is to provide a new rebar guide attachment for a conveyor that eliminates the user from having to place the rebar back upon the conveyor upon them having been cut.

Even still another object of the present invention is to provide a new rebar guide attachment for a conveyor that aligns the rebar prior to dispensing in racks thus preventing the user from having to take time to straighten the rebar.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
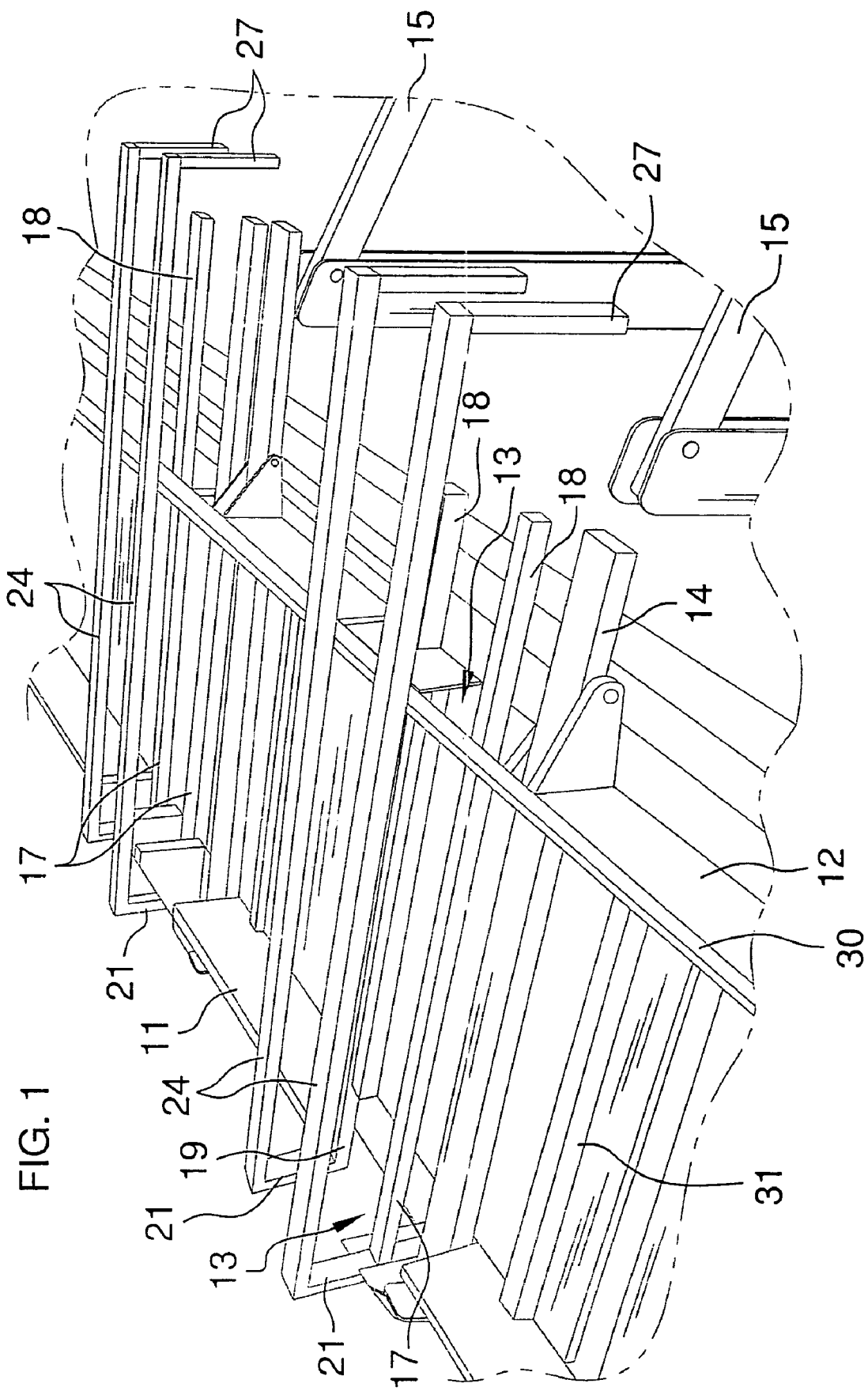
FIG. 1 is a top perspective view of a new rebar guide attachment for a conveyor according to the present invention.
Figure 2:
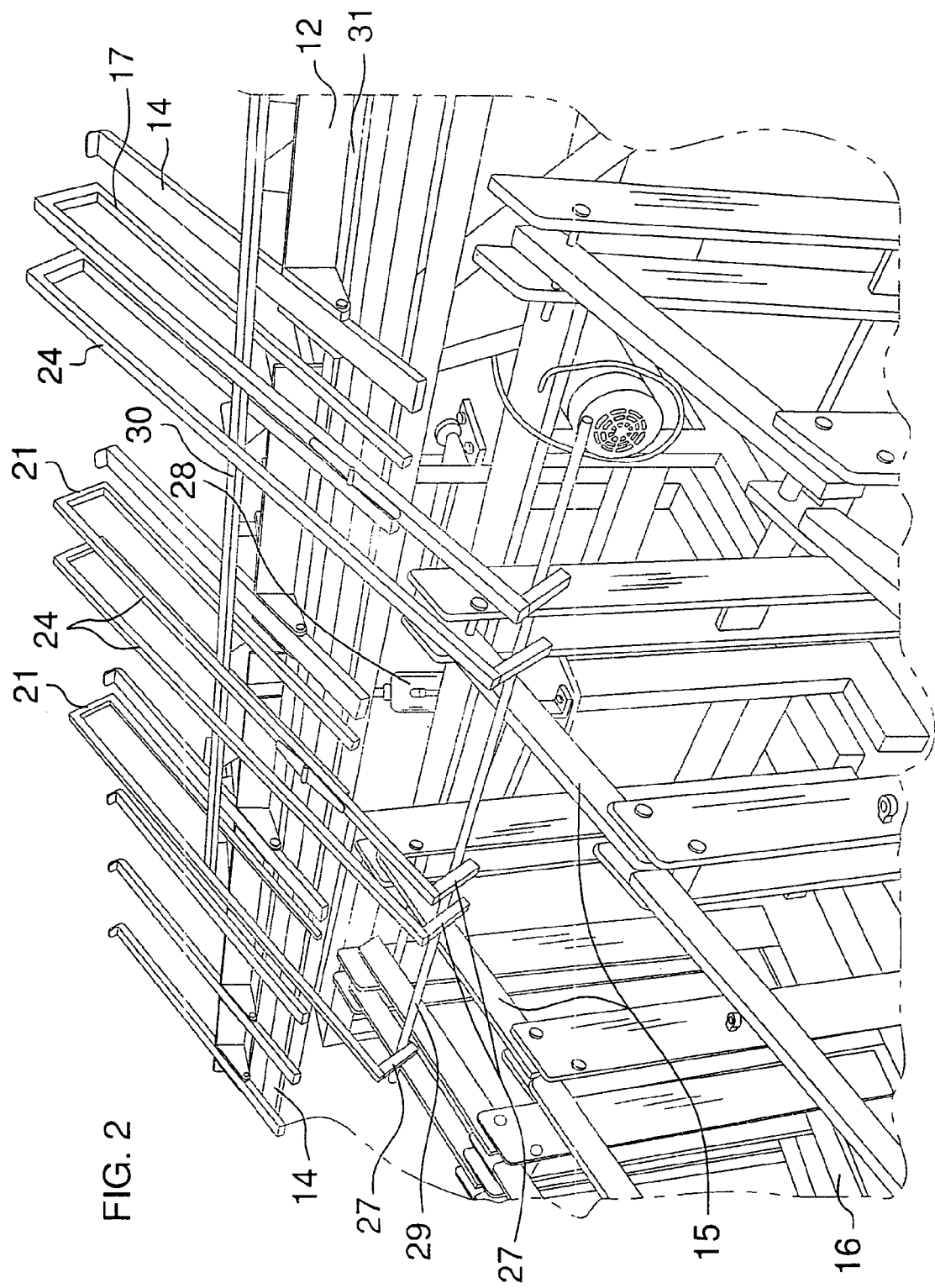
FIG. 2 is a top perspective view of the present invention showing the aligning of the rebar upon being dispensed in a rack.
Figure 3:
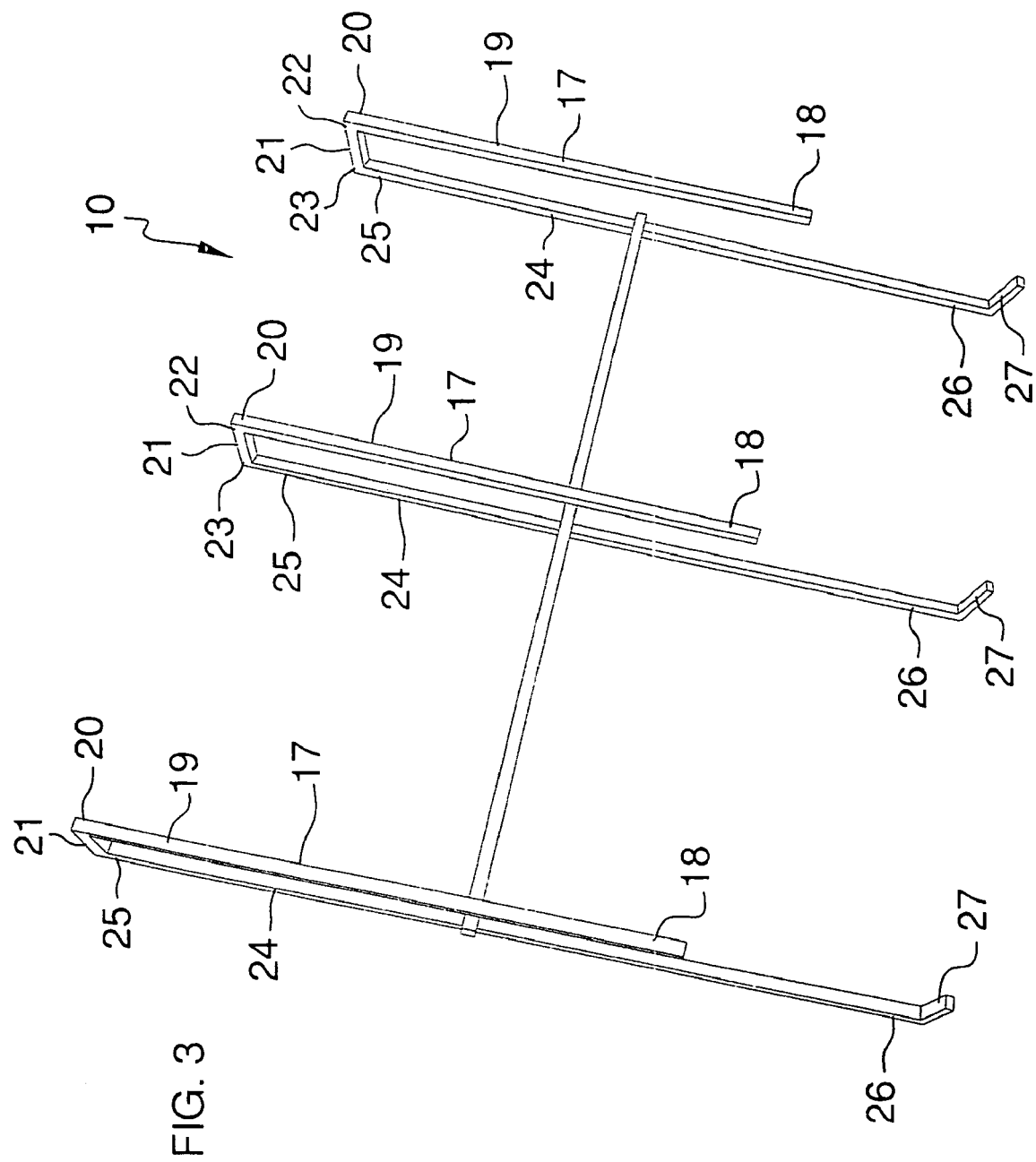
FIG. 3 is a perspective view of the rebar guide.

With reference now to the drawings, and in particular to FIGS. 1 through 3 thereof, a new rebar guide attachment for a conveyor embodying the principles and concepts of the present invention and generally designated by the reference numeral 10 will be described.

As best illustrated in FIGS. 1 through 3, the rebar guide attachment 10 for a conveyor 31 with a dispensing rack 14, slide members 15, and a receiving rack 16, wherein the conveyor 31 includes side walls 11,12 having slots 13 and the dispensing rack 14 is conventionally and pivotally attached to one of the side walls 11,12 and being conventionally and pivotally liftable with an actuator 28 such as an air cylinder to dispense rebar 29 upon the slide members 15 and onto the receiving rack 16. The rebar guide attachment 10 comprises a rebar guard and alignment assembly being conventionally mounted upon the conveyor 31 for preventing rebar 29 from spilling out of the conveyor 31 upon being processed and cut and for aligning the rebar 29 prior to being dispensed onto the receiving rack 14. The guard and alignment assembly includes a plurality of elongate support members 17 being spaced apart and being conventionally mounted upon the conveyor 31, and also includes a plurality of spacer members 21 being conventionally attached to the elongate support members 17, and further includes a plurality of elongate guard members 24 being conventionally attached to the spacer members 21, and also includes a plurality of peg members 27 being conventionally attached to the elongate guard members 24.

Each of the elongate support members 17 is disposed across the conveyor 31 generally perpendicular to the side walls 11,12 and has a first end portion 18 which is conventionally attached to the dispensing rack 14. Each of the elongate support members 17 also has a second end portion 19 which is removably received in a respective one of the slots 13 of one of the side walls 11,12 of the conveyor 31 to support rebar 29 which is conveyed thereupon. The elongate support members 17 are spaced apart and along the conveyor 31.

Each of the spacer members 21 has a bottom end 22 which is conventionally attached at an end of the second end portion 19 of a respective elongate support member 17 and extends upwardly generally perpendicular to the elongate support member 17. Each of the elongate guard members 24 has a first end 25 being conventionally attached to a top end 23 of a respective spacer member 21 with each of the elongate guard members 24 being spaced above a respective one of the elongate support members 17. Each of the elongate guard members 24 has a longer length than that of respective one of the elongate support members 17 and is disposed generally parallel to a respective one of the elongate support members 17. The rebar guide attachment further comprises one or more elongate brace members 30 being conventionally attached to and interconnecting the elongate member members 4.

Each of the peg members 27 is conventionally attached to a second end 26 of a respective one of the elongate guard members 24 and depends downwardly therefrom generally perpendicularly to a respective one of the elongate guard members 24. The peg members 27 are disposed in functional cooperation with the slide members 15 such that the peg members 27 and the slide members 15 stop and align the rebar 29 upon the rebar 29 being dispensed from the dispensing rack 14 and before the rebar 29 is received by the receiving rack 16. The peg members 27 are in contactable relationship to a plane interconnecting and resting upon the slide members 15 so that the rebar 29 cannot pass between the peg members 27 and the slide members 15.

In use, the user places and processes the rebar 29 onto the conveyor 31 and onto the dispensing rack 14 by using conventional means to cut the rebar 29 to the desired lengths. As the rebar 29 is being processed, some of the rebar 29 will pop up and try to spill over the side walls 11,12 of the conveyor 31. The elongate guard members 24 prevent the rebar 29 from spilling off the conveyor 31 during the processing thereof by blocking the rebar 29 as the rebar 29 pops up during processing. After the rebar 29 is processed, the user energizes the actuator 28 which is conventionally attached to the dispensing rack 14 and which conventionally and pivotally lifts the dispensing rack 14 to dispense the rebar 29 from the conveyor 31. The rebar 29 slides off the dispensing rack 14 and onto the slide members 15 which are positioned at a slant above the receiving rack 16. The peg members 27 in cooperation with the slide members 15 stop the rebar 29 upon the slide members 15 and the rebar 29 is aligned against the peg members 27 so that the rebar 29 can be dispensed onto the receiving rack 16 without any of the rebar 29 spilling over the receiving rack 16. Because of the slant of the slide members 15, the rebar 29 slides against the peg members 27 which are aligned to one another such that the peg members 27 rest in a plane which is generally parallel to the side walls 11,12 of the conveyor 31. Once the rebar 29 are aligned due to gravitational effects, the user pivotally lowers the dispensing rack 14 which allows the rebar 29 to be received by the receiving rack 16. The peg members 27 are raised and removed out of contactable relationship with the rebar 29 and because of the downwardly slant of the slide members 16, the rebar 29 slide down the slide members 15 and onto the receiving rack 16.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the rebar guide attachment for a conveyor. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rebar guide attachment for a conveyor comprising:

a conveyor;

a dispensing rack;

wherein said dispensing rack is pivotally attached to said conveyor for dispensing rebar;

said rebar guide attachment further comprising a rebar guard and alignment assembly wherein said rebar guard and alignment assembly is pivotally mounted upon said conveyor for preventing rebar from soiling out of said conveyor noon being cut and for aligning the rebar prior to the rebar being dispensed wherein said guard and alignment assembly includes a plurality of elongate support members wherein said elongate support members are spaced apart and pivotally mounted upon said conveyor;

said guard and alignment assembly also includes a plurality spacer members wherein said spacer members are attached to said elongate support members;

said guard and alignment assemble further includes a plurality of elongate guard members wherein said elongate guard members are attached to spacer members;

said guard and alignment assembly also includes a plurality of peg members wherein said peg members are attached to said elongate guard members; and wherein said conveyor includes side walls, and each of said elongate support members is disposed across said conveyor generally perpendicular to said side walls and has a first end portion which is attached to said dispensing rack.

2. The rebar guide attachment as described in claim 1, wherein said side walls of said conveyor have slots and each of said elongate support members also has a second end portion which is removably received in a respective one of the slots of one of the side walls of the conveyor to support rebar which is conveyed thereupon.

3. The rebar guide attachment as described in claim 2, wherein said elongate support members are spaced apart and along the conveyor.

4. The rebar guide attachment comprising:

a conveyor;

a dispensing rack;

wherein said dispensing rack is pivotally attached to said conveyor for dispensing rebar;

said rebar guide attachment further comprising a rebar guard and alignment assembly wherein said rebar guard and alignment assembly is pivotally mounted upon said conveyor for preventing rebar from spilling out of said conveyor upon being cut and for aligning the rebar prior to the rebar being dispensed wherein said guard and alignment assembly includes a plurality of elongate support members wherein said elongate support members are spaced apart and pivotally mounted upon said conveyor;

said guard and alignment assembly also includes a plurality of spacer members wherein said spacer members are attached to said elongate support members;

said guard and alignment assembly further includes a plurality of elongate guard members wherein said elongate guard members are attached to said spacer members;

said guard and alignment assembly also includes a plurality of peg members wherein said peg members are attached to said elongate guard members; and wherein each of said spacer members has a bottom end which extends upwardly generally perpendicular to said elongate support member.

5. The rebar guide attachment as described in claim 4, wherein each of said elongate guard members has a first end, wherein said first end is attached to a top end of a respective said spacer member, and each of said elongate guard members is spaced above a respective one of said elongate support members.

6. The rebar guide attachment as described in claim 5, wherein each of said elongate guard members has a longer length than that of respective one of said elongate support members and is disposed generally parallel to a respective one said elongate support members.

7. The rebar guide attachment as described in claim 6 further comprising at least one elongate brace member wherein said at least one elongate brace member is attached to an interconnecting said elongate guard members.

8. The rebar guide attachment as described in claim 5, wherein each of said peg members is attached to a second end of a respective one of said elongate guard members and depends downwardly therefrom generally perpendicularly to a respective one of said elongate guard members.

9. The rebar guide attachment as described in claim 8 further comprises slide members for sliding the rebar; wherein said peg members are disposed in functional cooperation with said slide members said such that said peg members and the slide members stop and align the rebar upon the rebar being dispensed from the dispensing rack.

10. The rebar guide attachment as described in claim 9, wherein said peg members are in contactable relationship to a plane interconnecting and resting upon the slide members.

11. The rebar guide attachment as described in claim 10, wherein said peg members are aligned with one another such that said peg members rest in a plane which is generally parallel to the side walls of the conveyor.

* * * * *